United States Patent Office 3,485,889
Patented Dec. 23, 1969

3,485,889
DISPROPORTIONATION PROCESS
Keith Vaughan Williams, Shepperton, and Leonard Turner, Woking, England, assignors to The British Petroleum Company Limited, London, England, a corporation of Great Britain
No Drawing. Filed Mar. 29, 1967, Ser. No. 626,682
Claims priority, application Great Britain, Apr. 7, 1966, 15,517/66
Int. Cl. C07c 3/10
U.S. Cl. 260—683       8 Claims

ABSTRACT OF THE DISCLOSURE

Olefins are disproportionated over a catalyst comprising rhenium carbonyl supported on alumina.

---

This invention relates to a catalyst suitable for use in the disproportionation of acyclic olefinic hydrocarbons and to a process for the disproportionation of acyclic olefinic hydrocarbons.

By the term "disproportionation" throughout this specification is meant the conversion of the feed hydrocarbon to a mixture of hydrocarbons having lower and higher carbon numbers than the feed hydrocarbon.

According to one aspect of the present invention there is provided a catalyst, suitable for use in the disproportionation of acyclic olefins, the catalyst comprising rhenium carbonyl supported on alumina.

Preferably the catalyst contains 0.1–20% by weight of rhenium carbonyl expressed as a percent by weight of the catalyst.

The catalyst may be prepared by contacting rhenium carbonyl with a bed of preheated alumina maintained in a fluidised condition, preferably by an ascending stream of an inert gas, e.g., nitrogen, carbon dioxide or helium. Suitably the alumina is maintained at 20–500° C. during fluidisation.

Preferably the alumina is thermally activated in air at a temperature in the range 300–900° C. for a period of time in the range 1 minute to 20 hours and then under similar conditions in an inert gas such as nitrogen.

Alternatively the catalyst may be prepared by impregnating alumina with a solution of rhenium carbonyl in an inert solvent.

Suitable inert solvents include liquid hydrocarbons, e.g., cyclohexane.

Before impregnation the alumina may be thermally activated, either in a stream of an inert gas, or preferably in a stream of air or oxygen followed by a final treatment in an inert gas. Suitably the alumina is treated in air at a temperature in the range 300°–900° C., for 1 minute to 20 hours and then under similar conditions in an inert gas.

An improved catalyst results if the alumina is treated with acid before thermal activation.

The acid employed may be any strong inorganic or organic acid. Preferred acids include hydrochloric acid and acetic acid.

The acid is generally employed in aqueous solution. Preferably, the concentration of the aqueous acid is in the range 0.001 N to 10 N.

Acid treatment may be effected under any combination of temperature and pressure below the critical values for water.

Acid treatment is preferably carried out for 10 minutes to 20 hours.

According to another aspect of the present invention there is provided a process for the disproportionation of an acyclic olefinic hydrocarbon which process comprises contacting an acyclic olefin hydrocarbon with a catalyst comprising rhenium carbonyl supported on alumina under conditions of temperature and pressure which effect disproportionation of the feed.

Acyclic olefins suitable as feeds include $C_{3-30}$ alkenes, preferably straight chain alkenes. The alkenes may be alpha, beta, or gamma etc. alkenes. Suitable alkenes include propylene, butene-1, butene-2, pentene-1, pentene-2, hexene-1, hexene-2, hexene-3, heptene-1, heptene-2, heptene-3, octene-1, octene-2, etc. Branched chain $C_{3-30}$ alkenes are also suitable feeds.

Optionally the impregnated alumina may be treated with an inert gas at a temperature in the range 20–500° C., preferably 60–200° C., prior to passing the olefin feedstock over it.

The conditions under which the process is carried out may vary with the composition of the feed and the desired product. Reaction temperatures may range from $-20°$ C. to $+500°$ C., temperatures in the range 50°–200° C. being preferred. As the temperature decreases the selectivity of the reaction increases.

Reaction pressures may be 0 to 2000 p.s.i.g.

In a continuous process the reaction time may vary between 0.01 second and 120 minutes, preferably between 0.1 second and 10 minutes.

In a batch process, suitable olefin/catalyst weight ratios are in the range 1000:1 to 1:1.

If desired the process may be effected in the presence of an inert diluent, for example a paraffinic or cycloparaffinic hydrocarbon.

In United States application Ser. No. 507,675 filed Nov. 15, 1965, there is disclosed a process for the preparation of olefins which process comprises reacting an initial mixture of two dissimilar acyclic olefins over a disproportionation catalyst. A catalyst according to the present invention is very suitable for use in such a process.

The invention is illustrated by the following examples.

EXAMPLE 1

A poorly crystalline gamma-alumina of surface area 255 sq. metres per gram and average pore size 55 A. was heated in a Soxhlet apparatus with 0.1 N HCl for 4 hours. It was then washed with distilled water to a constant pH of 5.4 and dried for 12 hours at 120° C. The alumina was activated by heating at 580° C. in a stream of dry air for 1 hour followed by dry nitrogen for 1 hour, the gases being passed at a GHSV of 2000. Rhenium carbonyl $Re_2(CO)_{10}$ was fluidised for 2 hours at 150° C. with the preactivated alumina in a stream of dry nitrogen. The final catalyst contained 10% by weight of rhenium carbonyl and was cooled under nitrogen to the reaction temperature used for the disproportionation reaction.

Propylene was passed over the catalyst at a GHSV of 1600. A sample of the product was taken after 5 min., the reaction temperature being 120° C. The result is shown in the table.

EXAMPLE 2

This example was similar in procedure to Example 1. However in this case the catalyst contained 5 percent by weight of the carbonyl and was fluidised at 200° C. Samples of the product were taken after 5 min. at 50° C. and after 10 min. at 100° C. The results are shown in the table.

EXAMPLE 3

This was the same as Example 2 except that the fluidisation temperature was 300° C. The results are shown in the table.

TABLE

[Dismutation of propylene over a $Re_2(CO)_{10}.Al_2O_3$ catalyst]
Feed GHSV:1,600
Products of disproportionation: Equimolar amounts of ethylene and n-butenes

| Example | Carbonyl content of catalyst, percent weight | Fluidisation temperature, °C. | Reaction temperature, °C. | Disproportionation, percent |
|---|---|---|---|---|
| 1 | 10 | 150 | 120 | 12.0 |
| 2 | 5 | 200 | 50 | 12.2 |
|   |   |     | 100 | 20.4 |
| 3 | 5 | 300 | 50 | 3.2 |
|   |   |     | 100 | 11.4 |

What we claim is:

1. A process for the disproportionation of an acyclic olefinic hydrocarbon which process comprises contacting an acyclic olefinic hydrocarbon with a catalyst comprising rhenium carbonyl supported on alumina under conditions of temperature and pressure which effect disproportionation of the feed.

2. A process according to claim 1 wherein the catalyst is treated with an inert gas at a temperature in the range 20–500° C., prior to passing the olefin feedstock over it.

3. A process according to claim 1 wherein disproportionation is effected at a temperature in the range −20° to +500° C.

4. A process according to claim 3 wherein disproportionation is effected at a temperature in the range 50–200° C.

5. A process according to claim 1 wherein disproportionation is effected under a pressure in the range 0 to 2000 p.s.i.g.

6. A continuous process according to claim 1 wherein the reaction time is in the range 0.01 second to 120 minutes.

7. A process according to claim 6 wherein the reaction time is in the range 0.1 second to 10 minutes.

8. A batch process according to claim 1 wherein the olefin/catalyst weight ratio is in the range 1000:1 to 1:1.

References Cited

UNITED STATES PATENTS

| | | | |
|---|---|---|---|
| 2,549,470 | 4/1951 | Howk et al. | 252—430 |
| 2,599,978 | 6/1952 | Davis et al. | 252—461 |
| 3,083,246 | 3/1963 | Holzman et al. | 260—683.15 |
| 3,129,243 | 4/1964 | Hubel | 260—673.5 |
| 3,408,310 | 10/1968 | McConnell | 252—461 |

PAUL M. COUGHLAN, JR., Primary Examiner

C. E. SPRESSER, Assistant Examiner

U.S. Cl. X.R.

252—430, 463